(12) United States Patent
Theodore

(10) Patent No.: US 7,563,372 B1
(45) Date of Patent: Jul. 21, 2009

(54) PACKAGE DEWATERING WASTEWATER TREATMENT METHOD

(76) Inventor: Marcus G. Theodore, 466 S. 500 East, Salt Lake City, UT (US) 84102

( * ) Notice: Subject to any disclaimer, the term of this patent is extended or adjusted under 35 U.S.C. 154(b) by 374 days.

(21) Appl. No.: 11/438,247

(22) Filed: May 22, 2006

Related U.S. Application Data

(60) Provisional application No. 60/684,392, filed on May 25, 2005.

(51) Int. Cl.
*C02F 3/00* (2006.01)
(52) U.S. Cl. ........................................ 210/609; 210/631
(58) Field of Classification Search ................. 210/609, 210/631
See application file for complete search history.

(56) References Cited

U.S. PATENT DOCUMENTS

| | | | |
|---|---|---|---|
| 3,803,806 A * | 4/1974 | Komline, Sr. ................. 95/205 |
| 4,053,394 A * | 10/1977 | Fisk ........................... 210/605 |
| 4,256,630 A * | 3/1981 | Fremont ...................... 530/418 |
| 4,304,673 A | 12/1981 | Reynolds et al. |
| 4,340,489 A | 7/1982 | Adams et al. |
| 4,377,486 A * | 3/1983 | Barrick et al. ............... 210/712 |
| 4,765,911 A | 8/1988 | Rasmussen |
| 5,087,378 A * | 2/1992 | Kovacs ....................... 210/742 |
| 5,221,312 A | 6/1993 | Buhidar |
| 5,906,750 A | 5/1999 | Haase |
| 2006/0243664 A1 * | 11/2006 | Pollock ....................... 210/629 |

OTHER PUBLICATIONS

United Nations Environmental Programme Division of Technology, Industry, and Economics Newsletter and Technical Publications Freshwater Management Series No. 1, "Bio-solids Management: An Environmentally Sound Approach for Managing Sewage Treatment Plant Sludge".
The 13th Element, John Wiley & Sons, Inc,, New York, 2000 Chapter "Oh Shit", pp. 271-273.
Phosphorus: "from urine to fire" by Peter E. Childs; http://www.u1.ie/-CinA/Issue 63/TOC27 Phosphorous.htm.

* cited by examiner

*Primary Examiner*—Chester T Barry
(74) *Attorney, Agent, or Firm*—Marcus G. Theodore

(57) ABSTRACT

A sewage treatment plant and method employing rapid sludge chemical dewatering technology in conjunction with slower conventional mechanical dewatering solids agglomeration and disposal methods to meet environmental permitting restrictions and siting limitations for disposal of sewage and wastewater.

10 Claims, 5 Drawing Sheets

PACKAGE DEWATERING WASTEWATER TREATMENT METHOD

RELATED APPLICATIONS

This patent application is a continuation-in-part of the provisional patent application entitled "Package Dewatering Method and Apparatus for Sewage Treatment" filed May 25, 2005 and assigned Ser. No. 60/684,392.

BACKGROUND OF THE INVENTION

1. Field

This invention comprises a rapidly installed package sewage treatment plant and method employing rapid sludge chemical dewatering technology.

2. State of the Art

Various sewage treatment methods and plants are known. Most large municipal systems employ a series of settling ponds sequentially concentrating the solids contained in wastewater either with or without polymers for separation from liquids via mechanical separation means, such as belt presses. In order to produce a clean effluent that can be safely discharged to watercourses, wastewater treatment operations use three or four distinct stages of treatment to remove harmful contaminants; according to the United Nations Environmental Programme Division of Technology, Industry, and Economics Newsletter and Technical Publications Freshwater Management Series No. 1, "*Biosolids Management: An Environmentally Sound Approach for Managing Sewage Treatment Plant Sludge*" which goes on to say: "Each of these stages mimics and accelerates processes that occur in nature. Preliminary wastewater treatment usually involves gravity sedimentation of screened wastewater to remove settled solids. Half of the solids suspended in wastewater are removed through primary treatment. The residual material from this process is a concentrated suspension called primary sludge, which will undergo further treatment to become biosolids.

Secondary wastewater treatment is accomplished through a biological process, which removes biodegradable material. This treatment process uses microorganisms to consume dissolved and suspended organic matter, producing carbon dioxide and other by-products. The organic matter also provides nutrients needed to sustain the communities of microorganisms. As microorganisms feed, their density increases and they settle to the bottom of processing tanks, separated from the clarified water as a concentrated suspension called secondary sludge, biological sludge, waste activated sludge, or trickling filter humus.

Tertiary or advanced treatment is used when extremely high-quality effluent is required, such as direct discharge to a drinking water source. The solid residual collected through tertiary treatment consists mainly of chemicals added to clean the final effluent, which are reclaimed before discharge, and therefore not incorporated into biosolids.

Combined primary and secondary solids comprise the majority of material used at municipal plants for biosolids production. Careful management throughout the entire treatment process allows plant operators to control the solids content, nutrient value and other constituents of biosolids. . .

The Municipal Sludge-to-Biosolids Treatment Process

There are three important factors to be addressed through further processing before this material can be utilized: (1) pathogen levels, (2) presence of potentially harmful industrial contaminants, and (3) water content.

The principal process employed to convert municipal sludge into biosolids is called stabilization. Stabilization accelerates the biodegradation of organic compounds, reduces the microbial population including pathogens, and renders the material microbiologically safe for agricultural use. Biological stabilization uses aerobic or anaerobic treatment to reduce the organic content of solids through controlled biodegradation. Chemical stabilization does not reduce the quantity of biodegradable organic matter in solids, but creates process conditions that inhibit microorganisms, thereby slowing the degradation of organic materials and reducing odors. The most common chemical stabilization procedure is to elevate the pH level of the solids using lime or other alkaline materials. Thermal drying and composting can also be used to stabilize biosolids. Full pasteurization of biosolids is not needed when the primary use is cropland application. Any potential risk to human health due to exposure to pathogens is eliminated through proper application procedures and in-situ microbial decomposition.

The presence of contaminants in the sludge or biosolids arising from industrial discharges is a more challenging problem and may be the deciding factor in determining the choice of a utilization disposal option. Put simply, many industries have habitually used the sewer system as a convenient and low-cost way to discharge hazardous wastes. The contaminants accumulate in the biomass and sludge, and can render the material unfit for any beneficial use. The most common options used for disposal of this contaminated material are landfill or incinerations, the cost of which is usually borne by the municipality rather than the hazardous waste generator. Biosolids utilization is a good, environmentally sustainable option when the wastewater is from municipal sources only, or when a fully enforced industrial pre-treatment and discharge control system is in place. The decision to select an environmentally sustainable approach to biosolids management can be used very effectively to review and correct polluting practices up-stream that should not be taking place.

The final concern is the water content of the product. Primary and secondary sludge generally contain no more than four percent solids, and the storage and transportation costs of this semi-liquid material limit the application to nearby farmland. Processes to remove water from solids, therefore, are common in biosolids production. The simplest method for removing water is gravity thickening, which involves concentration by simple sedimentation. Allowing sufficient time for solids to settle in tanks can increase suspended solids concentration to five or six percent. Thickening can also include flotation processes, gravity drainage belts, perforated rotating drums, and centrifuges. Nothing is added to biosolids during the gravity thickening processes.

Dewatering is another standard method of water removal in biosolids production. Simple dewatering involves containment of wastewater solids in drying beds or lagoons, where gravity, drainage, and evaporation remove moisture. More often, dewatering involves mechanical equipment such as filter presses, vacuum filters, and centrifuges. Mechanically dewatered solids typically contain between 20% and 45% solids. Finally, drying processes can be used to remove even larger volumes of water from biosolids. Thermal drying with direct or indirect dryers followed by polarization can remove virtually all water and stabilize biosolids to the point of full compliance with any regulatory requirement. This method is used where there is a viable commercial market for the palletized product."

Thus a particular wastewater treatment facility design is highly dependent upon the wastewater inflows and sludge composition and the discharge and treatment permitting restrictions and plant objectives. Oftentimes these plant designs employ thermophilic and other digestion processes to break down the sludge as part of the separation process. For example, Haase, U.S. Pat. No. 5,906,750 discloses a method for dewatering of sludge that has been digested by a thermophilic digestion process employing polymers. The polymers are extremely hydrophilic as they agglomerate fine particles for separation from the wastewater in the belt presses. This gelatinous mechanically separated mass is then usually land filled or admixed with other fuels for burning, and may contain significant pathogens and heavy metals. Once deposited and covered, these landfills do not breakdown rapidly. They comprise large deposits of unstable gelatinous soil, which acts as a breading ground for pathogens. If these separated solids are treated with chlorine for pathogen kill, chlorinated carcinogens often result, creating a different environmental hazard.

The mechanically separated gray water by-product is usually not treated and is then used for agricultural application, or dumped into a body of water for dilution. If treated with chlorine to kill pathogens before land application or dumping, its usage for agricultural purposes is lost as chlorine acts as an herbicide.

In addition, mechanical sludge separation typically requires a large series of settling ponds with wastewater residence times therein typically from 24 to 48 hours, depending upon the weather and nature of the sludge processed. Typically, landfill and polymer costs comprise approximately 30 percent of the wastewater treatment costs.

Other mechanical filtration methods provide sludge separation, but require continual unplugging of the filters; thereby generating significant ongoing costs of filter replacement and declining effectiveness as the filter is entrained with the separated solids.

As long as a mechanical sewage separation plant does not have to be moved and operates within its environmental discharge and landfill permit constraints, it provides a low operating and maintenance cost effective sewage disposal method but requires significant upfront capital investment and may result in long term environmental clean-up costs. As urban populations being served grow, and landfill costs increase, these plants seldom meet permitting constraints without significant upgrades in design, particularly with respect to pathogen gray water discharge and the negative impacts caused by mountains of gelatinous solids.

Other chemical wastewater treatment methods employ chemical agglomeration and disposal methods, such as Adams et al., U.S. Pat. No. 4,340,489 wherein wastewater is treated with sufficient sulfurous acid to effectuate solids separation and disinfection, while providing higher quality water. Reynolds et. al, U.S. Pat. No. 4,304,673 is another wastewater treatment process employing chemicals to continuously disinfect sewage sludge in a similar manner as Adams et al. Rasmussen, U.S. Pat. No. 4,765,911 is another two-stage chemical treatment process for treating aerobic or anaerobic sewage sludge. These chemical wastewater treatment methods are not package systems, which can be moved to accommodate the needs of a community, particularly in riparian areas subject to flooding.

Thus there remains a need for a method and apparatus, which provide a low cost rapidly installed mobile package sewage treatment system to meet environmental sewage disposal needs of the community. The method and apparatus described below provides such an invention.

SUMMARY OF THE INVENTION

The present invention comprises a rapidly installed wastewater treatment plant solids and liquids recovery system apparatus and method employing chemical dewatering technology.

Method

The method comprises chemically treating the wastewater with sulfur dioxide employing the mobile package wastewater treatment plant described below to separate the solids from the wastewater. FIG. 1 illustrated a typical layout of the method. After sulfur dioxide treatment, the chemically separated solids and the resultant chemically treated water is then disposed of consistent with applicable discharge permits.

The chemicals used for chemical dewatering are anhydrous or hydrous sulfur dioxide, which provide rapid water/solids separation. To minimize operator exposure to sulfur dioxide, preferably a sulfurous acid generator is employed. Sulfur dioxide chemical dewatering generates self-agglomerating solids, which can be more readily separated from the liquid fraction via conventional screens or drying beds without the need for polymers. Sulfur dioxide dissolves readily in water requiring little mixing. Disinfected sulfur dioxide separation of wastewater and dewatering of the resultant solids typically takes 20 minutes to an hour compared to 24 and 48 hours with present mechanical concentrators. Lesser amounts of the sulfur dioxide chemicals are required if solids/liquids separation is only required, rather than total disinfection. The dwell time required is dependent upon the alkalinity of the wastewater, and the porosity of the separation equipment screens sand filters or bags employed. Generally, it is easier to move the solids in a 1 to 3% slurry, so the SO2 is injected into the wastewater and held a minimal time in a pipeline or dwell tank to effectuate an initial separation where the solids reach the minimal particle size to collect in an equipment filter screen, sand filter, or drain bag. The solids then further dewater more completely by settling or separation within the equipment screens, filters or bags. For those sludges, which may require initial agglomeration assistance, acid resistant polymers, such as cationic copolymers of acrylamide with a cationic monomer, or cationically modified acrylamide or polyamine, may be employed may be added to the sulfurous acidified wastewater. Other polyquaternary amines, which are pH insensitive and function well over a broad pH, may also be employed.

The size of the treatment vessels and drain bags is therefore materially less so land usage is minimized. Chemically treated wastewater methods provide greater flexibility in equipment separation designs, which result in further cost savings. Nor is there usually any need for adding polymers to agglomerate first the solids as is the case with conventional belt presses and centrifugal or mechanical separators used in conventional mechanical sewage treatment plants, providing additional cost savings.

Material handling costs are also reduced. Sulfur dioxide batch treatment generates an initial separated solid having a water content of 30% to 40% in approximately 5 to 10 minutes, depending on composition. These solids, after separation, are then allowed to continue to chemically dewater until a solids composition having a water content as low as 1 to 4% is effectuated. If the chemical exposure is extended to approximately 20 minutes to insure disinfection, odor generation during the remainder of the treatment and disposal process is minimized as discussed in more detail below. Sulfur dioxide also acid leaches the heavy metals into the liquid fraction for case of removal via the subsequent addition of lime.

This rapid sulfur dioxide injection and separation generating self-agglomerating solids and heavy metals in the liquid fraction enables the use of much smaller gas injection and separation equipment than conventional mechanical dewatering systems. The sulfur dioxide dewatering equipment can be installed in modules, as needed. Thus, sulfur dioxide dewatering requires lower capital equipment cost investment, and has comparable or somewhat higher handling costs.

One preferred mobile equipment design uses a sulfurous acid generator to inject sulfur dioxide into the raw wastewater plant inflows having a low solids concentration of approximately 1% until odor suppression results and the initial solids are conditioned for separation. Usually this occurs at a pH of approximately 2 or lower. At this point, wastewater odors are eliminated, and the solids change color from a dark brown to a light grey and are more fibrous. These conditioned solids are then separated by passing them through the pores of a woven polymer bag placed on a drain pad, whose weave porosity is selected for rapid draining of excess water from the solids. The sulfur dioxide-treated wastewater is thus rapidly pumped directly into the woven polymer bag where the remaining chemical dewatering occurs without the need for further drying or treatment. The treated separated water is then collected on the drain pad and land applied in alkaline soil areas, or further treated with an alkaline reagent, such as lime for heavy metals removal or pH adjustment to meet permit discharge requirements.

Anhydrous and hydrous sulfur dioxides are strong disinfectants. When employed, they disinfect both the liquids and solids fractions to provide liquid handling and solids storage without the emissions of odors. Sulfur dioxide is relatively cheap and readily available. It may also be generated on-site from the burning of raw sulfur; particularly if additional heat from sulfur burning is required for solids process drying. Sulfur dioxide is extremely hydrophilic and forms sulfurous acid on contact with water. Injection until an elevated pH of approximately 2 for approximately 30 minutes results in complete disinfection; see Adams et al., U.S. Pat. No. 4,340,489.

For batch separation, after the initial approximately half hour solids conditioning and separation, the sulfur dioxide-treated solids have a moisture content of 30% to 40% and continue to shed water on a drying venue for approximately 24 hours, ultimately reaching the consistency and dryness of wood with a 1 to 4 percent by weight water content. This dried product may then be land filled, burned, or gasified in a manner consistent with the treatment plant unit processes and/or permit constraints.

The package chemical/mechanical dewatering sewage treatment method and apparatus is sized and expanded as needed and thus avoids the carrying costs of conventional mechanically concentrated systems constructed with excess capacity to meet projected future wastewater treatment needs. Chemical dewatering equipment has a much lower installation cost, which can be leased or installed on a pay as you go basis. For example, instead of the $26,500,000 price for a typical 10 MGD conventional plant, an under $1,000,000 modular unit may be added to the existing footprint to provide a 0.5 to 1 MGD hybrid chemical dewatering system. Additional 0.5 to 1 MGD modules may then be added and installed as needed. The concentrated solids are then disposed of in accordance with permitting requirements. For example, for those retrofitted plants land filling treated solids, such as the Central Valley Water Reclamation Facility in Salt Lake City, Utah, after installation the solids generated from the package dewatering equipment also landfills these treated solids for disposal. The water content of the Central Valley Water Reclamation Facility's mechanically separated solids is typically 40% by weight. Employing instead the package dewatering system method results in treated solids having a 4% by weight composition, results in a net 36% by weight savings. The more concentrated Sulfur dioxide dewatered solids should therefore reduce the present plant disposal costs of approximately $32.00/ton by about 36%. In addition, the reduced volume of treated solids extends the life of the present landfill facility by requiring less space to dispose of these more concentrated solids. Other savings from chemical dewatering result from avoiding the costs of polymers employed in more expensive conventional treatment plants, which typically average 9 pounds per ton of processed sludge as well as the reduced use of its belt presses. Off-setting these cost savings are the added costs of sulfur dioxide.

The amount of SO2 is dependent upon the alkalinity and bicarbonates of the wastewater inflows, which generally is no more than 800 mg/liter (Standard Methods, $14^{th}$ Ed. APHA, 1975); see Reynolds, U.S. Pat. No. 4,304,673. Reynolds found that generally no more than 2000, and preferably no more than about 600 mg of SO2 per liter of wastewater was required.

Using 1 liter equals 0.2641721 gallons and 1 mg=$\frac{1}{1000}$ gr., 1 gr.=2.204623×10-3 pounds; for a 0.5 MGD plant this equals:

0.5×1,000,000 gallons/day×1 liter/0.2641721 gallons× 2000 mg/liter×1 gr/1000 mg×0.26417212 gallons/liter× 2.204623×10-3 pounds/gram=2,204.6229 pounds/day or approximately 1 ton of sulfur dioxide under a worst case alkalinity scenario. It is expected that the 600 mg of SO2 per liter is more realistic for most wastewaters, reducing the chemical treatment tonnage required by one third. Current pricing in dollars per ton of liquid bulk fob works currently is around $230/ton so that the chemical dewatering cost is relatively nominal. This sulfur dioxide may be delivered to the site in tanks, or generated on site via sulfur burners. Sulfur burners are relatively efficient and have the additional benefit of generating considerable heat from sulfur burning, which can be used to supply heat to the treatment plants drying beds.

In areas where eutrophication is a problem, the acid leached heavy metals stripped from the solids can be removed from the treated wastewater stream via the addition of CaO or hydrated lime before discharge into a stream or lake. This not only precipitates the heavy metals as metal hydroxides, but some insoluble calcium phosphates. These are then removed via filtration and solid or land filled.

For cost comparison, the package sulfur dioxide chemical/mechanical dewatering sewage treatment method may also be adapted to generate added revenues from the gasification or burning of the concentrated high Btu solids for production of heat or electricity. In addition, there are added revenues from sales of the chemically demetalized and disinfected water sales. The package sulfur dioxide chemical/mechanical dewatering sewage treatment method may result in revenues from soil conditioning services associated with the land application of the acidified sulfur treated wastewater. This is particularly important in alkaline soil regions where the additions of acids to soils is routinely required, thus providing an additional potential revenue stream to be factored in against the plant costs. SO2 water conditioning also may be blended with the chlorine treated discharge from a conventional wastewater treatment plant to remove chlorine before land application.

In summary, the package chemical/mechanical dewatering sewage treatment method provides the following advantages Advantages Water Savings One advantage of the hybrid chemical/mechanical dewatering sewage treatment apparatus for wastewaters is its reduced process water loss. Chemically dewatered sludge processes are much faster than conventional mechanical dewatering systems so evaporation losses are reduced. Conventional mechanical concentration systems are most successful in areas where the excess wastewater is evaporated in the atmosphere in hotter more arid regions. Unfortunately, this evaporative consumptive use of water in arid regions is now becoming a conservation issue. Presently on the Jordan River system in Salt Lake City, Utah, various sewage treatment plants are seeking to claim water rights to the treated waters exiting their plants and divert and sell the same to different water drainages to off-set costs. These water right claims for the first time in Utah will indirectly establish the cost of evaporative consumptive use of water related to sewage treatment operations so that evaporated lost water now becomes a cost of operations. Not only is water lost through evaporation, but the high water content in the land filled sewage must also be factored in. Hence, future mechanical concentration wastewater treatment systems must factor in the lost process water consumption as a cost in evaluating the best sewage treatment mode as the volume entering the plant and leaving the plant is easily quantifiable and affects future water right claims.

The additional water generated from the hybrid chemical/mechanically dewatering sewage treatment apparatus often provides a significant amount of additional water, while maintaining the same treated water output for downriver users and habitat enhancements. This avoids plant operating dictates from downriver users who have vested rights to existing treatment water outflows.

Eutrophication

Other environmental clean-up advantages may be factored in employing the sulfur dioxide chemical/mechanical dewatering system, such as minimizing eutrophication causing algae bloom. Present mechanical concentration methods have focused on banning phosphate detergent usage, and removing phosphates from farm, and industrial sources entering wastewater streams before discharge to prevent eutrophication. These phosphate removal costs are significant, and fail to factor in the eutrophication impacts of heavy metals. *The Swedish Phosphate Report* concluded that removal of phosphates from detergents was pointless and ill advised. Water pollution was a far more complex problem than early environmental activists had assumed and it was proven to depend on a variety of factors, among which phosphate was perhaps one of the least important. The main cause was demonstrated to be industrial pollution by heavy metals, oils and insecticides, as all these substances kill the zooplankton that feed on the algae causing the problem; see *The 13th Element,* by John Emsley, John Wiley & Sons, 2000, at page 273, Chapter "Oh Shit". The removal of heavy metals and some phosphates by the hybrid chemical, mechanical dewatering system thus results in significant environmental benefits.

Fuel

Most mechanical dewatering methods generally produce sludge with high 30-40% water content as outlined above. This high water content prevents direct burning. These mechanically dewatered high water content sludges are admixed with fuels, such as coal, for burning or gasification because of the high water content. Alternatively, they must first be further dewatered via drying beds and dryers, which add to the processing costs. Generally, it has been found that these mechanical dewatered sludges seldom have enough independent fuel value for usage on-site by smaller facilities and must be disposed of using other methods, such as land filling or admixing with other fuels for burning.

Conversely, chemically dewatered sludge produced by injecting either gaseous $SO_2$ or aqueous $SO_2$ (sulfurous acid) provide solids with low water content and a relatively high BTU low sulfur concentrated fuel suitable for burning or gasification to produce heat, electricity, or other forms of useful energy, such as steam. The sulfur dioxide dewatering method produces a fuel with a fairly consistent BTU content dependent upon the raw product composition. For example, one chemically treated and separated sludge generated near Logan, Utah produced a chemically dewatered densified fuel having a BTU content similar to wood of between approximately 7,040 BTU/lb. ASTM (American Society Testing Method) 02382 and 7,290 BTU/lb. ASTM 02382. Initial separation took place in one half hour after injection of gaseous $SO_2$ having an initial 30% to 40% moisture content. If allowed to continue to completely dry over a 24 hour period, a moisture content of between 4% to 6% was achieved. This chemically dewatered sludge had the appearance, and texture similar to dark dry wood. It was essentially odorless with a moisture content of between 4% and 6%. It has a high cellulose solid content of between 94% and 96% similar to wood making them readily transportable and storable until burned or gasified. This dry wood like sludge had approximately 1.8% by weight $SO_2$ emissions, when burned, which is comparable to those produced by low sulfur coal. Depending upon the fat content of the solids in the wastewater, the treated solids may have even a higher BTU content than wood. Consequently, the by-product fuel of chemically dewatered concentrated sludge may be burned directly, and/or admixed with the mechanically separated sludge for burning or gasification.

Soil Conditioning

In arid regions where alkaline soils are often found, the hybrid chemical and mechanical dewatering method for optimizing sewage treatment plants may generate acidified wastewater discharge to provide soil conditioning benefits, which reduce nutrient and water agricultural demands by making the soil more porous. In addition, instead of removing chemicals via competing membrane technologies, a balanced chemical composition is generated with this hybrid chemical/mechanical dewatering of wastewater method, thus providing, an additional revenue source for this land conditioning method.

Community Preferences

Intangible aesthetic factors often drive the selection of a sewage treatment technology in those areas abutting urban development. The package chemical dewatering method meets community preference values in terms of added benefits or costs odor suppression, removal of heavy metals, pathogen kill, and reduced plant size. Although these aesthetic factors are often subjective, they are often the controlling factors in mandating wastewater treatment design.

Plant Security

The reduced chemical dewatering wastewater treatment plant footprint enables better plant security as there is less to protect. The employment of mobile units, which can readily be replaced and moved also provides better response time in the event of a disaster or incident. Also, emergency flooding can be anticipated and the plant treatment location varied to avoid flooding of large settling lagoons and the resultant contamination to the surrounding areas.

Apparatus

The apparatus comprises a package hybrid chemical/mechanical dewatering sewage treatment apparatus for wastewater inflow streams, which can be chemically dewatered by the injection of hydrous or anhydrous sulfur dioxide to rapidly agglomerate and separate solids from wastewater. Bottled SO2 may be employed to provide the supply of hydrous sulfur dioxide. Alternatively, raw sulfur may be burned to produce the SO2 as needed. A typical skid mounted sulfur generator producing hydrous sulfur dioxide such as those currently produced by Sweetwater International of Salt Lake City, Utah, and Harmon Systems International, LLC of Bakersfield, Calif. are employed to simultaneously generate anhydrous sulfur dioxide for gas injection and mixing in a water tower. Sulfur burners also have the advantage of minimizing SO2 release from explosion in the event of terrorist attack of the wastewater treatment plant.

A reaction vessel, such as a pipe or flow through vessel, is in communication with the wastewater inflow streams. A mixer is mounted within a reaction vessel and is associated with the supply of bottled sulfur dioxide for chemically injecting and admixing sufficient sulfur dioxide into the wastewater inflows until the solids agglomerate and separate from the liquid fraction of the wastewater. Alternatively, the wastewater inflows may be directed through the sulfur generator for admixing the SO2 into the wastewater. The reaction vessel is sized and structured to provide the desired dwell time for effectuating an initial solids/liquid separation by the sulfur dioxide of the treated wastewater. Where slurry transport is employed, minimal dwell time is required as discussed above so that the majority of the chemical dewatering occurs in the drying beds or mechanical separators.

In one preferred embodiment, the wastewater transport inflow pipes themselves are used as a reaction vessel treatment zone for injected bottled SO2. The pipe segment required for this sulfur dioxide treatment must be acid resistant to the acidified sulfur dioxide-treated wastewater. If not, an acid resistant extender made of stainless steel or polypropylene or similar acid resistant material is attached to the end of the transport inflow pipes. The length and diameter of the inflow pipe segment required for treatment is selected to allow sufficient dwell time therein after sulfur dioxide injection to effectuate the initial desired solid/liquid wastewater separation. If disinfected solids/liquid wastewater is required, the reaction zone is sized to provide an approximate 20-minute dwell time at pH 2 until total disinfection is achieved.

At least one drain pad is positioned and structured to collect and drain the solids from the sulfur dioxide-treated wastewater. These drain pads are constructed of an acid resistant material such as stainless steel, acid resistant cement or propylene liners. They have a large drying surfaces, which may be made of mesh or include drain holes or channels to direct the draining shedded water to a point of collection for disposal. The mesh or holes may be covered with a filtration cloth, such as a cotton or fiber sheet, to aid in separating the solids. Cotton sheets have the advantage of not having to be removed before burning the dried solids as their air emissions from burning are approximately the same as the dried solids.

The drain pads are structured to hold the separated solids until the desired chemical dewatering has occurred. Complete drying takes approximately 24 hours. However, a shorter drying time to produce solids with a higher water content for burning is often employed to provide a fuel with a higher BTU content. Usually, a series of drain pads are included so that at least one is being filled, while the others are draining the solids. Once the solids have drained sufficiently, they are removed via a front-end loader scraper and trucked for disposal. Preferably these drain pads are movable or rapidly constructed so that in the event of a flood emergency they may be relocated to higher ground.

The dried solids are then removed and disposed of with disposal means such as scrapers and loaders filling trucks for hauling the treated solids to a landfill. Alternatively, as the dried solids generally have a BTU content similar to wood, they may also be burned or gasified as a fuel. A mobile gasifier or boiler and electrical generator set, such as those produced by Thermogenics, Inc. of Albuquerque, N.Mex. may be employed for this purpose, or the solids transported to a more permanent stick built gasifier or electric generator for admixing with other fuels such as a fluidized coal bed electrical generator.

The mobile package wastewater treatment system may also be designed to take advantage of the disinfection properties of sulfur dioxide. The sulfur dioxide-treated solids and wastewater may therefore be held longer after initial separation to be disinfected to prevent odor generation and the spread of disease.

For those communities requiring covered solids containment, the sulfur dioxide-treated wastewater may be passed into an acid resistant porous bag placed on the drain pad. These drain bags have a mesh sized to collect and separate the treated solids from the treated wastewater drains through the drain bag onto the drain pad and into a collection system associated with the drain pads. The filled drain bag is then disposed of generally via landfill, or burned or gasified. Polypropylene bags such as those produced by, and Miratech a division of Ten Cate Nicolon of Pendergrass, Ga. provide a bag, which is acid resistant, and prevents bird vector transport of the solids. Depending upon the air emissions standards, these drain bags may or may not have to be separated from the dried sludge solids contained therein before burning or gasification.

The chemically separated dried solids, if completely dried have a moisture content comparable to wood (approximately 1 to 4%). For burning, these chemically dried solids are admixed with conventional separated solids with higher moisture content of approximately 30-40% in a ratio to provide a combined fuel with an overall moisture content of approximately 20%.

Where plant security is an issue, the sulfur dioxide is preferably generated as needed by employing sulfur burners which burn raw sulfur only as needed; thereby minimizing exposure from accidental SO2 chemical release.

Generally, the treated wastewater may land applied particularly in areas of alkaline soils where acidified water is required for soil conditioning. If the heavy metals acid leached from the treated solids are too high for land application, these heavy metals in the treated wastewater may be removed by alkaline precipitation of the metals therein as metal hydroxides. These metal hydroxides are then removed via settling or filtration via belt presses or polypropylene bags. The demetalized chemically treated water is then land applied or sold to and end user. Alternatively, the demetalized chemically treated water is disposed of by draining into streams or lakes to dilute heavy metal concentration in the water to minimize eutrophication.

Summary

The package sulfur dioxide chemical and mechanical dewatering method and apparatus optimizes sewage treat-

DESCRIPTION OF THE ILLUSTRATED EMBODIMENTS

Figure 1:
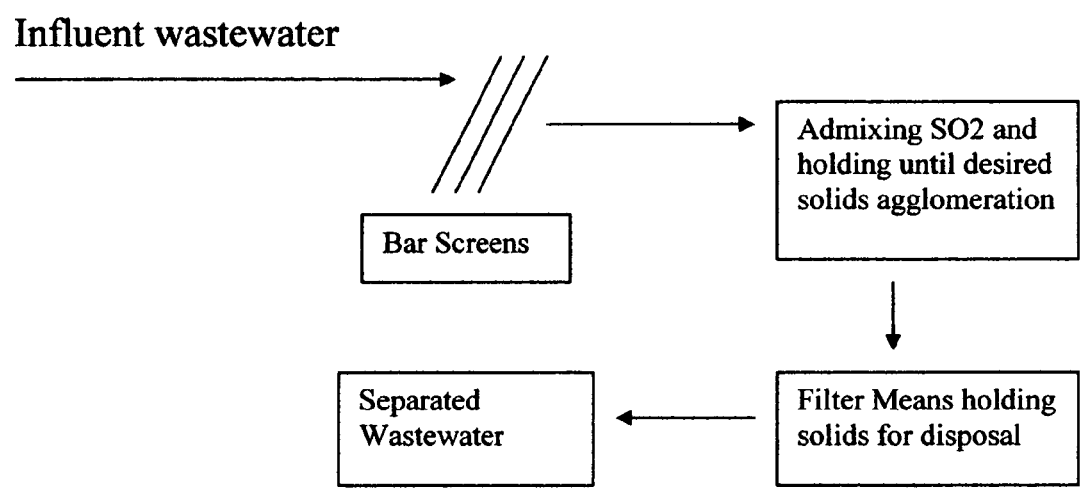
FIG. 1 illustrates a typical the layout of the chemical dewatering method.

FIG. 1 illustrates a typical the layout of the chemical dewatering method.

Figure 2:
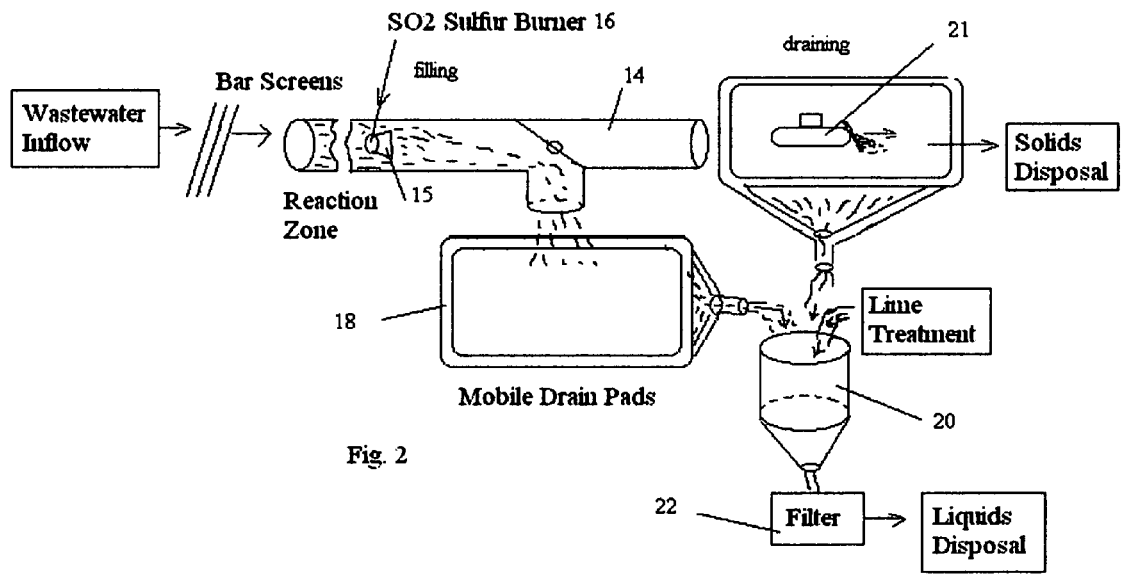
FIG. 2 illustrates a preferred layout of the chemical dewatering equipment employing drying beds.

FIG. 2 illustrates the simplest embodiment of a skid mounted sulfur dioxide wastewater treatment plant 10. The influent wastewater inflows are preliminarily screened with bar screens 12 before entering a reaction vessel 14 structured as a serpentine polyurethane acid resistant pipe 14. The serpentine pipe 14 may have a gas diffusion mixer 15 mounted therein to admix sulfur dioxide from a skid mounted sulfur burner 16 to separate the solids from the liquids by agglomeration. Or, the sulfur burner 16 itself may be used to admix sulfur dioxide into the wastewater streams where the solids concentrations are fairly low (1 to 3% by weight). The serpentine pipe 14 is flexible and has a T-bend with valve 17 to direct the separating fluid mixture onto mobile drain pads 18. At least two mobile skid mounted pads 18 are included so that as one is filling, the other is draining. These pads 18 separate and hold the solids, while allowing the treated wastewater to drain into a metals separation collection vessel 20.

After drying, the solids are scraped from the pads 18 with a scraper 21 for hauling and land filling.

The treated wastewater is collected in a metals separation vessel 20 into which lime is then added to precipitate the heavy metals as metal hydroxides for separation. This alkaline-treated mixture is then passed through another filter 22 to remove the metal hydroxide cake from the treated water before discharge and land application.

In the example shown in FIG. 2, the serpentine pipe 14 is sized to provide one half hour dwell time for the screened influent to provide sufficient dwell time for disinfection.

Figure 3:
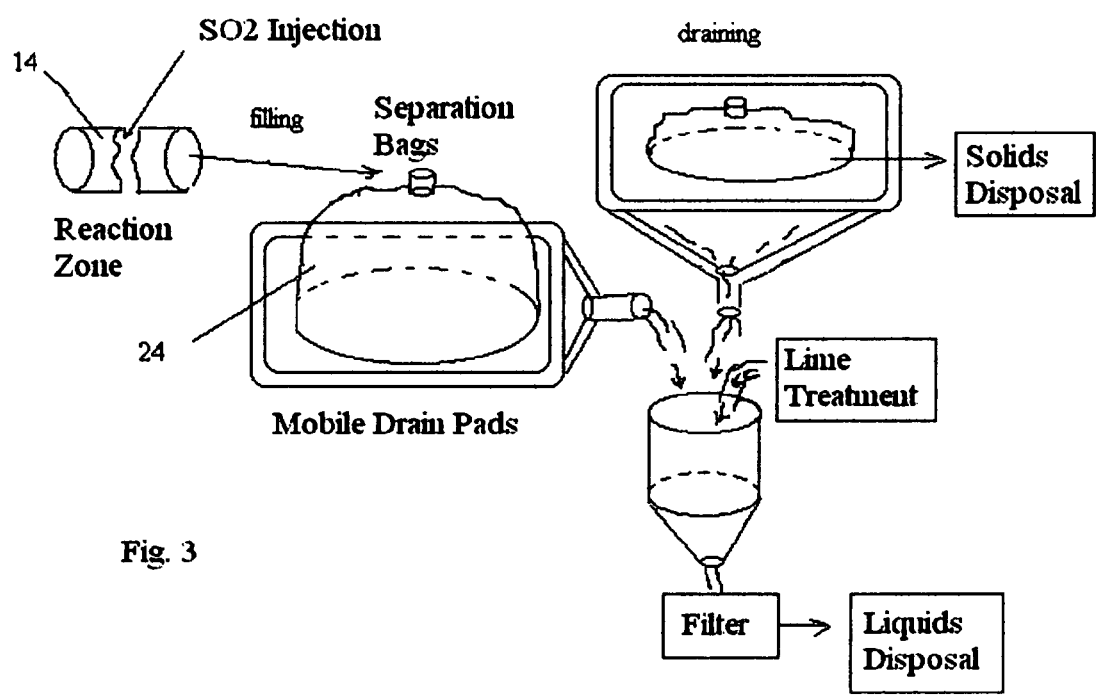
FIG. 3 illustrates a preferred layout of the chemical dewatering equipment employing separation bags.

FIG. 3 illustrates the embodiment of FIG. 1 employing polyurethane woven separation bags 24 mounted onto mobile drain pads 18. The sulfur burner 16 is used to admix the sulfur dioxide into low concentration wastewater streams until the solids agglomerate sufficiently to be held by the weave of the separation bags 24. If necessary, the treated wastewater streams are held in a treatment vessel (not shown), or a serpentine tube until the initial separation is accomplished. These separation bags 24 separate and hold the solids, while allowing the treated wastewater to continue to drain into the metals separation collection vessel 20. They prevent access by birds and other animals while hiding from view the drying solids. When the solids are dry, the filled separation bags 24 are removed for hauling and land filling or burning.

Figure 4:
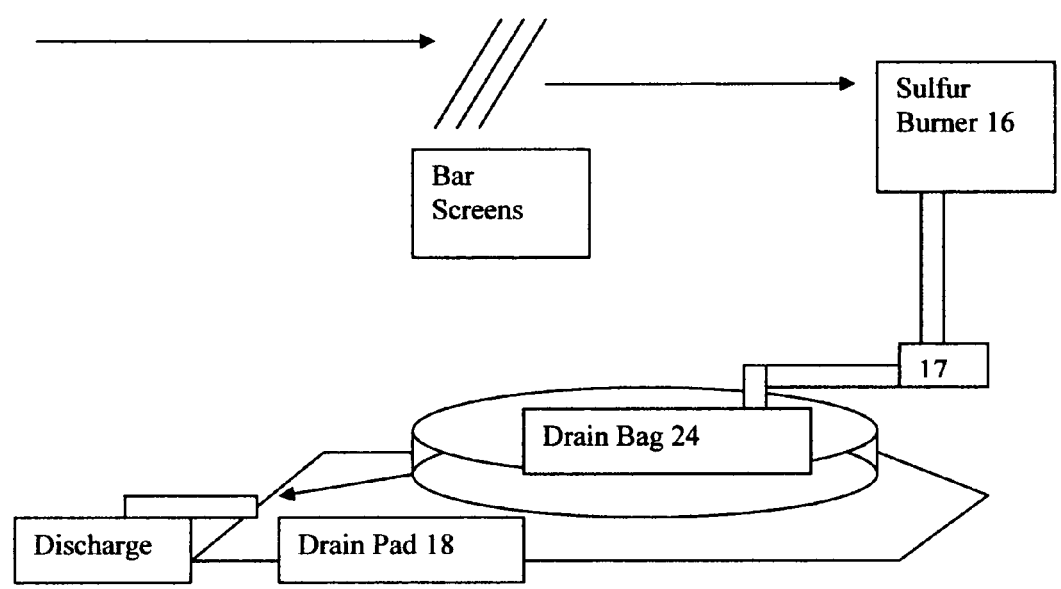
FIG. 4 illustrates a preferred embodiment of a chemical/mechanical dewatering system.

FIG. 4 illustrates a preferred embodiment of a chemical/mechanical dewatering system comprising a skid mounted sulfur dioxide wastewater treatment plant 10. The influent wastewater inflows of 1 to 3% solids by weight are preliminarily screened with bar screens 12 before entering a sulfur burner 16 which admixes sulfur dioxide into the wastewater inflows to initially separate the solids from the liquids by agglomeration into an approximately 3% concentration. The partially separated solids are then pumped through a flexible pipe 14 with a T-bend with valve 17 to direct the separating fluid mixture into a woven polymer bag 24 placed on a plastic sheeting pad 18 sloped for draining. These bags 24 separate and hold the solids for further dewatering in the bag up to 1 to 4% water by weight. The treated wastewater is collected on the sheeting pad 18 and is then land applied. After drying, the solids and bag are scraped from the plastic sheeting pads 18 with a scraper 21 for hauling and land filling.

Figure 5:
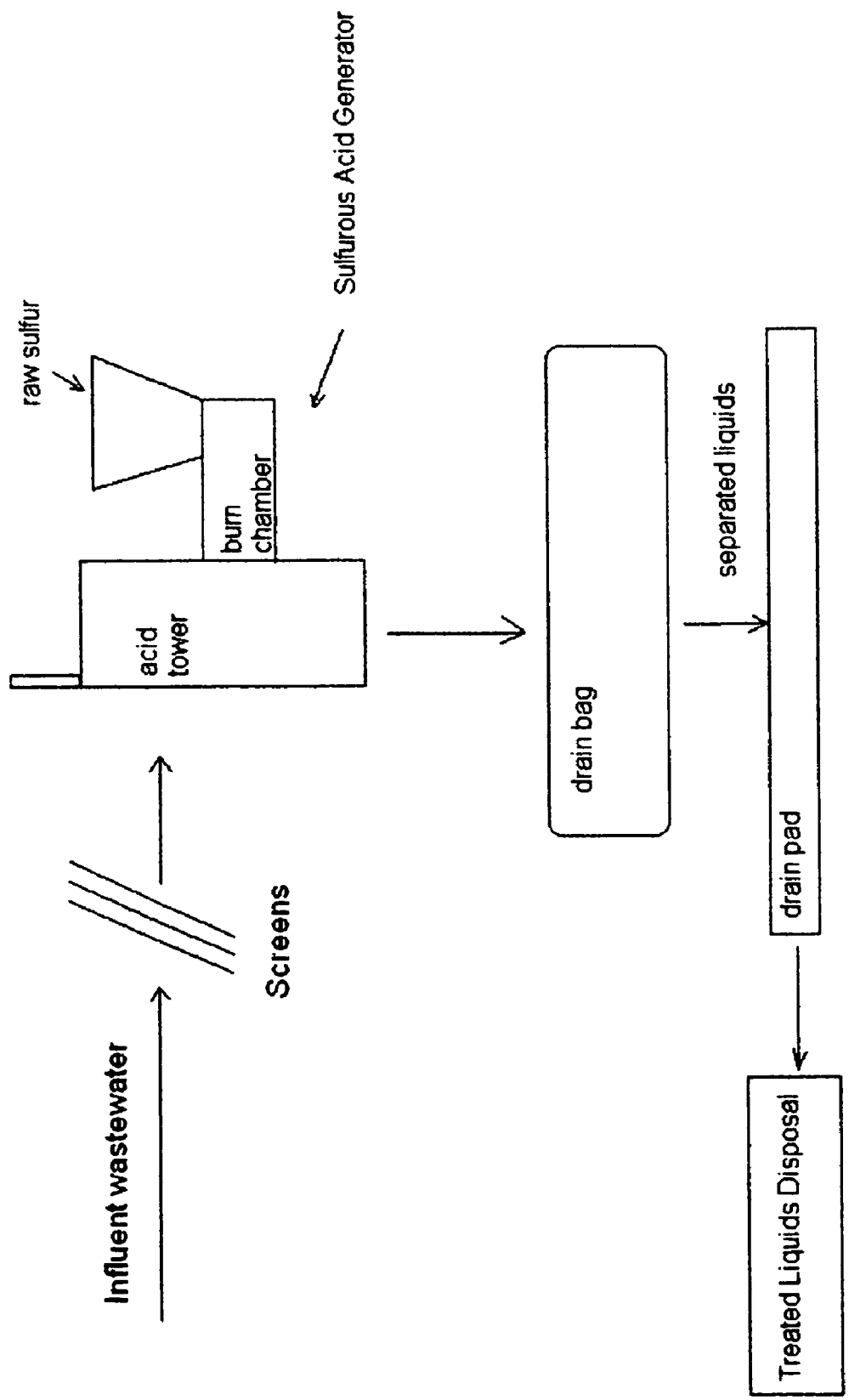
FIG. 5 illustrates another preferred embodiment of a chemical/mechanical dewatering equipment layout.

FIG. 5 illustrates another preferred embodiment of the simplest chemical/mechanical dewatering equipment layout wherein the screened influent wastewater is treated with sulfur dioxide and held within the acid tower of a sulfurous acid generator forming a slurry with minimal particle size for solids separation in a drain bag. The separated treated liquids are then collected on a drain pad for disposal.

In summary, the invention provides a package sulfur dioxide chemical/mechanical sewage treatment plant and method employing rapid sludge chemical dewatering technology in conjunction with slower conventional mechanical dewatering solids agglomeration and disposal methods to meet cost, environmental permitting restrictions and other sitting and permitting limitations for disposal of sewage and wastewater.

Although this specification has made reference to the illustrated embodiments, it is not intended to restrict the scope of the claims. The claims themselves recite those features deemed essential to the invention.

I claim:

1. A package chemical/mechanical dewatering sewage treatment method for wastewater inflow streams, which can be chemically dewatered by the injection of sulfur dioxide to separate solids from wastewater comprising:
   a. injecting a supply of sulfur dioxide into the wastewater inflow streams,
   b. holding the sulfur dioxide-treated wastewater for the dwell time required to partially agglomerate the solids, and
   c. depositing the sulfur dioxide-treated partially separated wastewater onto at least a drain pad including filtration means structured to receive the sulfur dioxide-treated wastewater and separate the solids from the sulfur dioxide-treated wastewater liquid fraction for disposal or capture, the drain pad structured to hold the separated solids until the desired chemical dewatering has occurred.

2. A package hybrid chemical/mechanical dewatering sewage treatment method for wastewater inflow streams according to claim 1, wherein the filtration means comprise an acid resistant porous bag to receive the treated wastewater and solids placed on the drain pad, the porous bag having a mesh sized to collect and separate the treated solids from the treated wastewater.

3. A package hybrid chemical/mechanical dewatering sewage treatment method for wastewater inflow streams according to claim 2, wherein the drain bag with dried solids is land filled, burned or gasified.

4. A package hybrid chemical/mechanical dewatering sewage treatment method for wastewater inflow streams according to claim 1, wherein the chemically separated dried solids are admixed with mechanically separated solids with higher moisture content in a ratio to provide a combined fuel with a reduced overall moisture content of the mechanically separated solids.

5. A package hybrid chemical/mechanical dewatering sewage treatment method for wastewater inflow streams according to claim 1, including adding polymers to the sulfur dioxide-treated wastewater to aid in initial solids separation.

6. A package hybrid chemical/mechanical dewatering sewage treatment method for wastewater inflow streams according to claim 1, wherein the drain pad is movable as needed to treatment locations above flood zones.

7. A package hybrid chemical/mechanical dewatering sewage treatment method for wastewater inflow streams according to claim 1, including injecting alkaline chemical into the sulfur dioxide-treated wastewater to pH adjust and precipitate heavy metals contained therein as metal hydroxides for removal leaving a demetalized chemically treated water.

8. A package hybrid chemical/mechanical dewatering sewage treatment method for wastewater inflow streams according to claim 7, including filtering the heavy metal hydroxide precipitate from the demetalized chemically treated water for collection and disposal.

9. A package hybrid chemical/mechanical dewatering sewage treatment method for wastewater inflow streams according to claim 8, wherein the demetalized chemically treated water is land applied.

10. A package hybrid-chemical/mechanical dewatering sewage treatment method for wastewater inflow streams according to claim 7, wherein the demetalized chemically treated water is disposed of in water to dilute its heavy metal concentration to minimize eutrophication.

* * * * *